March 2, 1965   C. A. KINGSFORD-SMITH   3,172,101
COHERENT SIGNALLING SYSTEM
Filed March 18, 1960
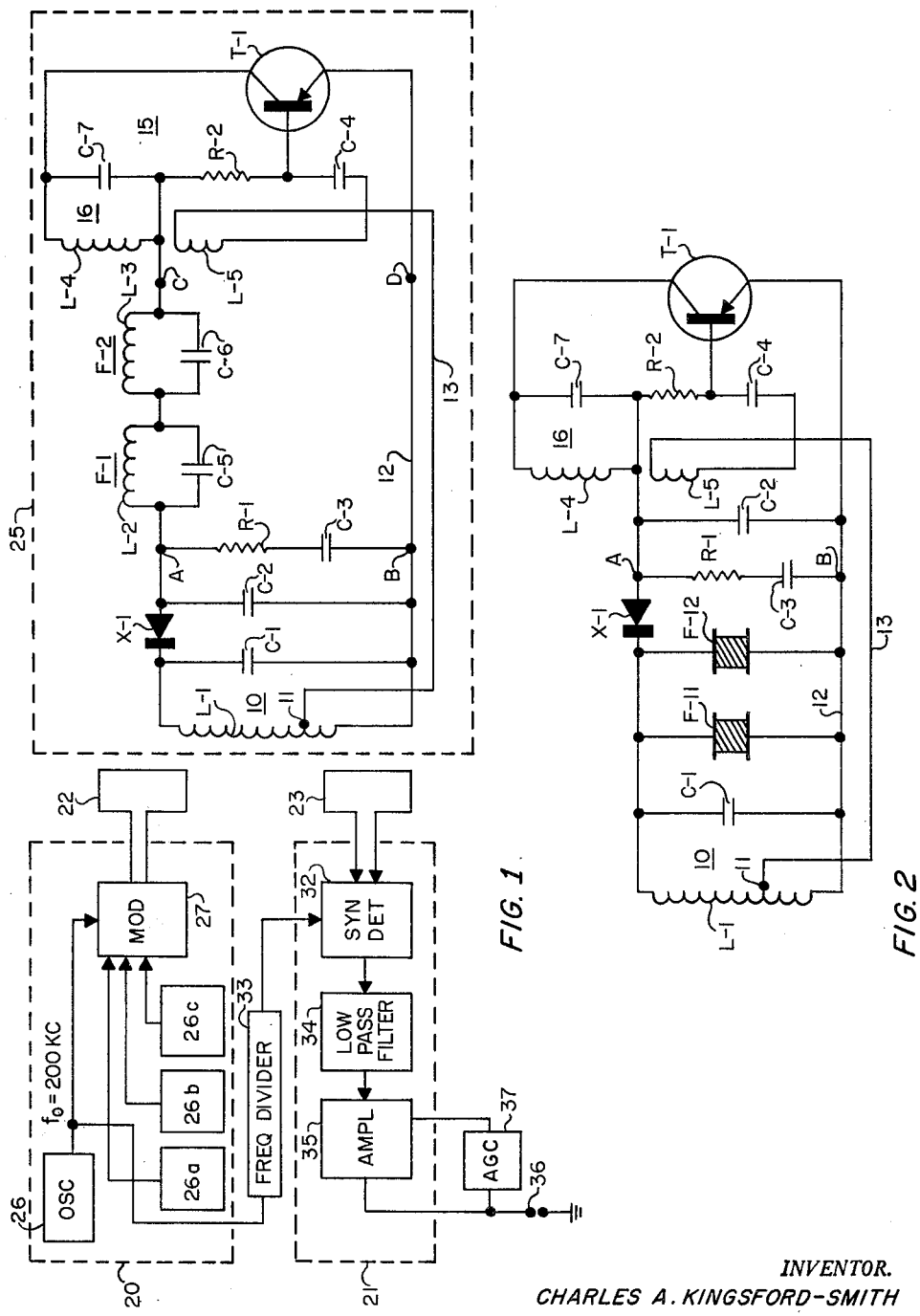
INVENTOR.
CHARLES A. KINGSFORD-SMITH
BY Edward A. Robinson
ATTORNEY

United States Patent Office 3,172,101
Patented Mar. 2, 1965

3,172,101
COHERENT SIGNALLING SYSTEM
Charles A. Kingsford-Smith, Menlo Park, Calif., assignor to General Precision, Inc., Binghamton, N.Y., a corporation of Delaware
Filed Mar. 18, 1960, Ser. No. 15,859
9 Claims. (Cl. 343—6.5)

The invention relates to interrogator-responder signalling systems, and more particularly, to an improved interrogator-responder system utilizing passive responders to transmit digital data. Appl. Ser. No. 739,909 filed June 4, 1958, by Clarence S. Jones for "Signalling System" now Patent No. 3,054,100 and assigned to the same assignee as the instant invention, discloses an improved interrogator-responder system capable of electronically transmitting data between an interrogator device and one or more passive responder devices, where relative motion may occur between the interrogator device and each responder, so that signals may be provided from each responder which uniquely identify the responder, and, or instead, indicate one or more conditions associated with the responder. The exemplary disclosed application of the prior invention is the use of passive responder devices on vehicles, such as railroad boxcars, for the purpose of identifying each car as it passes along a track adjacent to which an interrogator unit is located. The interrogator unit is essentially a transmitter-modulator connected to supply a strong interrogator signal on an interrogator frequency to an interrogator output conductor or coil located near or under the railroad tracks. When a boxcar carrying a responder approaches along the tracks, nearing the interrogator coil, operating voltage of sufficient magnitude is induced in the responder to cause emission by the responder of a coded response signal as a response frequency differing in frequency from the interrogator frequency. A response pickup coil located near the interrogator coil and tuned to the response frequency picks up the response signal, which consists of a radio frequency carrier having a plurality of audio sidebands. Each individual responder is coded to use a unique and different set of audio frequencies in modulating its response carrier, so that detecting and decoding a response signal enables one to identify a responder. Apparatus of the abovedescribed type is marketed under the trademark "Tracer" by the assignee of this application.

Due to a number of reasons considered in detail in previous applications, the described apparatus is more accurate and reliable than prior systems and is less susceptible to noise than prior systems. The Jones system also has much greater system capacity without equipment duplication and bandwidth, and therefore is economically superior to prior systems. System capacity refers to the number of different responders between which the system can distinguish. A main feature of the present invention which allows increased accuracy and less susceptibility to noise is coherent detection. By causing the response carrier always to be transmitted at fixed phase and frequency relationships to the interrogator carrier, and then comparing the phase and frequency of the received signal with those of the interrogator signal, one may synchronously detect the response signal and reject as noise those components of the received response signal not in proper phase with the interrogator signal. One coherent system of this type is disclosed in appl. Ser. No. 850,828, filed November 4, 1959, now Patent No. 3,137,847, by Robert A. Kleist for "Signalling System," which application is assigned to the same assignee as the present invention. In the present invention, the interrogator frequency is selected to be higher than the response frequency, and the response oscillator in each responder is selected to operate at a sub-multiple of the interrogator frequency. Utilizing this arrangement undesired reception by the response receiver of interrogator signal harmonics is practically eliminated, while systems wherein the response frequency is a multiple of the interrogator frequency are impractical, because interrogator signal strength is usually many orders of magnitude greater than response signal strength. Also, the response frequency may be synchronized quite simply and accurately in fixed relationship to the interrogator carrier frequency with the present invention. In general, synchronization is more easily accomplished when the sync or control frequency is an integral multiple of the frequency to be controlled. One technique of the present invention, wherein the interrogator frequency is the second or greater harmonic of the response frequency, is highly advantageous in that no harmonic components of the interrogator frequency will fall into the pass band utilized for the response frequency.

In the abovementioned Kleist application the responder oscillator is synchronized to an odd multiple of one-half the interrogator frequency, such as 3/2 or 5/2 of the interrogator frequency, in order that response receiver reception of interrogator frequency harmonics be minimized. The present invention has the advantage over the Kleist system that the response oscillator may be synchronized very easily by injection of a small amount of the interrogator carrier.

It is an object of this invention to provide an improved responder oscillator for the system generally described above, and more specifically, it is an object to provide an oscillator circuit for responding on a sub-harmonic or lower frequency than the frequency of the interrogator.

A further object of this invention is to provide an improved signalling system including an interrogator circuit which generates a carrier signal of a predetermined frequency, a response oscillator circuit which receives the carrier signal and generates a response signal of a sub-harmonic of the carrier signal, and a receiver circuit which is controlled in frequency and phase by the interrogator circuit and is responsive to the precise sub-harmonic frequency generated by the response oscillator circuit.

Another object is to provide an improved method and means for identifying a vehicle as it moves into spaced relation with an interrogation station, and more particularly it is an object to provide an interrogation signal which may be sensed by apparatus on the vehicle to cause a coded response signal to be generated. The response signal will be a sub-harmonic of the interrogation signal and will be sensed by a receiver which is adjacent to or part of the interrogation station and which is synchronized from the interrogation signal and will be therefore synchronized also with the sub-carrier response signal.

Numerous other objects and advantages will be apparent throughout the progress of the specification which follows. The accompanying drawings illustrate a certain selected embodiment of the invention and the views therein are as follows:

FIG. 1 is an electrical schematic diagram of an interrogator-responder signalling system using responder device similar to that disclosed in appl. Ser. No. 739,909, modified in accordance with teachings of the present invention; and FIG. 2 is an electrical schematic diagram of a different type of known responder device modified in accordance with teachings of the present invention. In each of the figures certain well-known parts are shown in block form for clarity.

Referring to FIG. 1, an interrogator unit, represented as block 20 and interrogator coil 22, is arranged to provide an interrogator signal to excite any responder, tuned to receive the signal, which approaches within a selected distance from coil 22. The interrogator signal may comprise, for example, an interrogator carrier frequency $f_0$ having a plurality of sideband frequencies, such as would be obtained by modulating the carrier with a plurality of separate audio tones. For example, ten or fifteen discrete audio tones might be modulated on a carrier frequency $f_0$ of 200 kilocycles per second. The number of subcarrier or audio tones will determine the maximum system capacity, as it determines the number of digits available for coding. In FIG. 1 the the carrier frequency $f_0$ is provided by carrier frequency oscillator 26, subcarrier or audio frequencies are generated by oscillators 26a, 26b, 26c, etc., only a few being shown, and modulator 27 impresses the discrete audio tones on the carrier.

Assuming that the interrogator carrier frequency $f_0$ is 200 kilocycles, and that ten subcarrier frequencies are modulated on the carrier over a 10 kilocycle per second band centered with respect to the carrier, tuned circuit 10 of responder 25 will be tuned to 200 kc. and tuned broadly enough to receive carrier $f_0$ and all of the sidebands. Tuned circuit 10 is shown as comprising a conventional parallel resonant LC circuit including inductance L-1 and capacitance C-1.

The voltage induced across tuned circuit 10 by the interrogator signal is applied through a demodulator circuit shown as comprising diode rectifier X-1 and RF capacitor C-2, which demodulates the interrogator signal, providing between points A and B a composite voltage, having a direct component from demodulation of the carrier and a plurality of audio components corresponding to those audio frequencies modulated on the carrier in interrogator 20. The composite voltage is applied through a coding network which selectively filters out or selectively passes certain of the audio subcarriers. The responder 25 of FIG. 1 is shown as utilizing two audio rejection filters F-1 and F-2 in its coding network, so that audio tone components corresponding in frequency to the frequencies of filters F-1 and F-2 are removed from the coded composite voltage present between points C and D. It will be understood that other responders may be equipped with different numbers of coding filters, and with filters having frequencies of others of the audio tones, so that a large number of responders may be uniquely coded.

The coded composite voltage between terminals C and D is applied to operate a response oscillator 15. The direct component of the voltage will be seen to be applied via oscillator tank circuit 16, comprising inductance L-4 and capacitance C-7, across the collector-emitter circuit of transistor T-1, causing transistor current flow. Tickler coil L-5 is inductively coupled with resonant tank 16 to provide regenerative feedback to sustain oscillation. Inasmuch as the coded voltage applied to the oscillator contains those audio components which were passed by the coding network, the output signal of response oscillator 15 will be modulated with the same. The response signal provided by oscillator 15 is received by response pick-up means shown as comprising response pick-up coil 23 and response receiver 21. The series RC network comprising R-1 and C-3 may be provided to avoid clipping of the modulating frequencies, by providing a load impedance to modulating signals that will not exceed the D.C. load resistance of the detector portion of the responder, and preventing cross-modulation of the various subcarrier audio frequencies detected.

In accordance with the invention, the resonant frequency of tank 16 is selected to be an integral submultiple of the interrogator signal frequency, for example 100 kilocycles per second, so that inductance L-4 and capacitor C-7 are selected to make tank 16 resonant at 100 kc. Tickler coil L-5, which in prior embodiments is connected in series with capacitor C-4 between the transistor base and emitter, is returned to a tap 11 on coil L-1 of input tuned circuit 10, so that a small amount of interrogator signal, i.e., that amount inducted in the lower portion of coil L-1, is connected in series with the 100 kc. regenerative feedback voltage induced into tickler coil L-5 from inductor L-4 of response oscillator tank circuit 16, which is inductively coupled to coil L-5. This simple introduction of a small amount of interrogator frequency voltage into the control circuit of response oscillator 15 will serve to synchronize the frequency of the response oscillator at an exact sub-multiple of the interrogator frequency.

The proper amount of synchronizing voltage is determined by the free-running frequency of the response oscillator and by the sensitivity of the oscillator to synchronizing signals from an independent source. If tank circuit 16 itself would accurately control oscillator frequency very nearly at 100 kc., with little tendency for the oscillator free-running frequency to drift, very little synchronizing voltage need be inserted into the response oscillator control circuit. Conversely, where oscillator free-running frequency is liable to drift significantly, as in some applications of the invention where large temperature changes must be tolerated, a larger amount of synchronization is needed. Using well-known and conventional design techniques, the sensitivity of oscillator 15 may be arranged so that the 200 kc. synchronizing signal need be no more than about 5% as large as the normal oscillator operating voltage, i.e., the voltage appearing across the inductor L-4 of response oscillator tank 16.

It is desirable to maintain the amount of synchronizing signal at a minimum because the synchronizing signal also contains audio or subcarrier components, and use of the synchronizing signal will effect a partial reinsertion of frequencies trapped out by filters F-1 and F-2. In accordance with known techniques, however, receiver 21 may incorporate threshold detection means (not shown), so that the small amount of subcarrier signal re-inserted for synchronization will be ignored when the received response signal is decoded.

In a typical commercial embodiment of the invention for identifying busses carrying responders as they pass along a city street in which interrogator and response pick-up coils are buried, interrogator 20 might apply a signal of perhaps 50 watts to coil 22. Responders on busses approaching the interrogator coil become excited sufficiently to transmit effective response signals when the responders approach within about 3 feet of the interrogator coil. While the power of response signals varies greatly as interrogator coil-to-responder-to-response pickup coil distances vary, the maximum response signal received during closest coupling in a typical system is of the order of .01 microwatt. The great disparity between interrogator signal power and response signal power would effect a complete obliteration or masking of the response signal if the response signal frequency corresponded to a harmonic of the interrogator frequency. Using the invention, however, in the illustrative example described, harmonics of the interrogator signal lie at 400, 600, 800 etc. kilocycles per second, and since the response signal is emitted and received at a frequency of 100 kc., none of the interrogator signal's inevitable harmonics interfere with the received response signal, and the integral sub-multiple relative frequency arrangement allows great simplicity in response oscillator synchronization, so that accurate and low-noise coherent detection may be effected.

The received response signal from response pick-up coil 23 is applied, after amplification (not shown), if desired, to a conventional synchronous detector 32, to which a reference sub-multiple frequency is applied from a conventional frequency divider 33, the latter circuit being controlled in phase and frequency by the interrogator carrier frequency generated by carrier-oscillator 26. Thus, components of the response signal at coil 23 not in proper phase with the reference sub-multiple signal are rejected as noise by synchronous detector 32. The output signal from detector 32 is applied through a low-pass filter 34 to obtain selectivity and through an amplifier 34 (having an automatic gain control loop 37) to obtain sensitivity. The signal at 36 may be decoded, by a conventional comb filter, for example, to provide a parallel digital signal identifying the responder.

FIG. 2 illustrates a modified form of responder, in which sideband frequencies representing system digits are trapped out at radio frequencies prior to demodulation of the interrogator signal. This type of responder is disclosed in detail and claimed in appl. Ser. No. 8,723 filed February 15, 1960, by Robert A. Kleist and Clarence S. Jones, now Patent No. 3,018,475, which application is assigned to the same assignee as the present invention. The coding network of FIG. 2 is shown as comprising two crystal filters F–11 and F–12, each of which is chosen to be series-resonant at one of the interrogator signal sidebands, so as to effectively short out two selected sideband frequencies. If a conventional transmitter-modulator is used to provide the interrogator signal, a pair (upper and lower) sidebands will exist for each audio subcarrier, and two crystal RF filters would be needed to eliminate a given subcarrier. In order to obviate such duplication, a single sideband signal having a plurality of discrete individual sideband frequencies, each corresponding to a different system digit, is ordinarily used with the device of FIG. 2. An improved type of transmitter unit suitable for use with the type of responder illustrated in FIG. 2 is disclosed in detail and claimed in appl. Ser. No. 15,597 filed on March 17, 1960 by Robert A. Kleist, now Patent No. 3,036,295, which application is assigned to the same assignee as the present invention. As far as the present invention is concerned the responder of FIG. 2 otherwise operates generally similarly to that of FIG. 1, so that no detailed description of the operation of the FIG. 2 circuit is deemed necessary. One important distinction, however, is that substantially greater amounts of interrogator synchronizing frequency may be applied to the response oscillator 15 of FIG. 2, to control response oscillator phase and frequency more closely without re-injecting the frequencies filtered out for coding purposes, since the coding filters in FIG. 2 remove the sideband energies in the responder pick-up circuit itself, from where the synchronizing signal is taken.

While the carrier signal generated by the interrogator circuit 20 may contain many harmonic frequencies of a higher order, there will be no sub-harmonic frequencies, or frequencies generated which are lower in value than the frequency of the carrier signal. Since circuits may be designed to oscillate at the lower order frequencies or sub-harmonics of the carrier, these circuits may be synchronized with the carrier and with each other with relative simplicity and economy. Therefore, this invention provides a reliable signalling system, economical in design, and simple in operation. A further advantage of this invention resides in the fact that the signalling system is immune to most noise and spurious interference effects.

Changes may be made in the form, construction and arrangement of the parts without departing from the spirit of the invention or sacrificing any of its advantages, and the right is hereby reserved to make all such changes as fall fairly within the scope of the following claims.

What is claimed is:

1. Signalling apparatus comprising an interrogating means at a fixed location, a receiving means at the fixed location, and a response means movable into spaced relation with both the interrogating means and the receiving means, said interrogating means being operable to generate a carrier signal of a first frequency, said response means being operable to receive the carrier signal and to generate a response signal of a second frequency, said second frequency being a sub-multiple of the first frequency, said receiving means being sensitive to the second frequency.

2. Signalling apparatus comprising an interrogating means and a receiving means both at a fixed location, and a response means movable into spaced relation with the fixed location, said interrogating means operable to generate a carrier signal of a first frequency and a plurality of sub-carrier signals each of a different sideband frequency with respect to the first frequency, said response means including a first tuned circuit which may be excited by the carrier signal, and an oscillator circuit for generating a response signal of a second frequency which is a sub-multiple of the first frequency, said response means further including means for eliminating selected ones of the sub-carrier signals and for modulating the response signal with the remaining sub-carrier signals, said receiving means being synchronously coupled to the interrogating means and being sensitive only to the response frequency, said receiving means being operable to receive the response frequency and to detect which of the sub-carrier signals have been eliminated.

3. The signalling apparatus in accordance with claim 2 wherein the response signal is of a frequency equal to one-half that of the carrier signal, and said receiving means being coupled to the interrogating means by a frequency divider circuit such that the receiving means will be precisely synchronized to the response signal.

4. Apparatus for identifying vehicles comprising an interrogator and a receiver both at a fixed location, and a responder mounted in a vehicle to be identified and movable therewith into spaced relation with the fixed location, said interrogator including a circuit for generating a carrier signal, a plurality of circuits each operable to generate a sub-carrier signal, and a circuit for combining the sub-carrier signals with the carrier signal to produce a plurality of corresponding sideband frequencies, said responder including a means for receiving the carrier signal and detecting the sub-carrier signals, means for eliminating selected ones of the sub-carrier signals and an oscillator means for generating a response signal having a frequency of one-half the carrier signal, said receiver being coupled to the interrogator by a means for halving the frequency of the carrier signal, said receiver including a synchronous detecting means operable to synchronize with the half frequency of the carrier signal and sensitive only to the responder signal, and means for detecting the sub-carriers which have been eliminated in the responder.

5. In a signalling system, a responder for receiving an interrogation signal of a first frequency and for generating a response signal of a second frequency which is a sub-multiple of the first frequency, said responder comprising a means for receiving and detecting the first frequency, and an oscillator means tuned to the second frequency, said oscillator means being synchronously coupled to the receiving means.

6. In a signalling system, a responder for receiving an interrogation signal including a carrier frequency and a plurality of sideband frequencies and for generating a coded response signal of a second frequency which is a sub-multiple of the first frequency, said responder comprising a tuned circuit for receiving the interrogation signal, a detector for passing a plurality of audio signals corresponding to the sideband frequencies, a means for eliminating selected ones of the audio signals in accordance with an identification code, and an oscillator for generating the sub-multiple response signal having the remaining audio signals combining therewith, said oscillator circuit being synchronously coupled to the tuned circuit whereby the response signal is synchronized with sub-multiple of the carrier frequency.

7. In a signalling system, a responder for receiving an interrogation signal including a carrier frequency and a plurality of sideband frequencies and for generating a coded response signal of a second frequency which is a sub-multiple of the first frequency, said responder comprising a tuned circuit for receiving the interrogation signal, a detector for passing a plurality of audio signals corresponding to the sideband frequencies, at least one tuned circuit for trapping out and eliminating a selected one of the audio signals in accordance with an identification code, an oscillator for generating the sub-multiple response signal having the remaining audio signals combined therewith, and a means coupling the oscillator with the tuned circuit whereby the response signal is synchronized with a sub-multiple of the carrier frequency.

8. In a signalling system, a responder for receiving an interrogation signal including a carrier frequency and a plurality of sideband frequencies and for generating a coded response signal of a second frequency which is a sub-multiple of the first frequency, said responder comprising a tuned circuit for receiving the interrogation signal, a means tuned to selective frequencies shunting across the tuned circuit for shorting and eliminating selected ones of the sideband frequencies, a detector for passing a plurality of audio signals corresponding to the remaining sideband frequencies, and an oscillator circuit for generating the sub-multiple response signals having the audio signals combined therewith, said oscillator circuit being synchronously coupled to the tuned circuit whereby the response signal is synchronized with the sub-multiple of the carrier frequency.

9. Signalling apparatus comprising an interrogating means, a receiving means, and a response means movable to spaced relation with both the interrogating means and the receiving means, said interrogating means being operable to generate a carrier signal of a first frequency, said response means being operable to receive the carrier signal and to generate a response signal of a second frequency, said second frequency being a sub-multiple of the first frequency, said receiving means being coupled to the interrogating means for receiving a synchronizing signal whereby the receiving means is synchronized with the response signal of the second frequency, said receiving means being synchronously coupled to the integrating means and being sensitive to the second frequency.

References Cited in the file of this patent

UNITED STATES PATENTS

| 2,421,106 | Wight | May 27, 1947 |
| 2,851,592 | Webster | Sept. 9, 1958 |

FOREIGN PATENTS

| 545,294 | Canada | Aug. 27, 1957 |